United States Patent [19]

Taylor

[11] Patent Number: 4,790,941
[45] Date of Patent: Dec. 13, 1988

[54] FLUID DECONTAMINATION SYSTEM

[75] Inventor: John A. Taylor, Pinckney, Mich.

[73] Assignee: Separation Dynamics, Inc., Southfield, Mich.

[21] Appl. No.: 169,981

[22] Filed: Mar. 18, 1988

[51] Int. Cl.⁴ .............................................. B01D 13/01
[52] U.S. Cl. .................................. 210/639; 210/644; 210/651; 210/652; 210/654; 210/788
[58] Field of Search ............... 210/634, 638, 639, 644, 210/649, 650, 651, 652, 653, 654, 788; 524/210

[56] References Cited
U.S. PATENT DOCUMENTS 4,622,344  11/1911  Babcock et al. .................... 524/210
4,707,542  11/1987  Friedman et al. .................. 210/634

*Primary Examiner*—Frank Sever

*Attorney, Agent, or Firm*—Reising, Ethington, Barnard, Perry & Milton

[57] ABSTRACT

An apparatus and process for removing corrossive contaminants from a hydrocarbon including the steps of mixing water with a hydrocarbon contaminated with corrossive ions into a mixture and conducting the flow of the mixture tangentially relative to a surface of a plurality of microporous hydrophobic hollow fiber membranes and separating a permeate flow of decontaminated hydrocarbon from retentate mixture. An apparatus (10) is provided for this separation process which includes a mechanism for removing resistance to flow through the hollow fiber membrane (16) aiding in increased uniform tangential flow through the membrane (16).

15 Claims, 2 Drawing Sheets

FLUID DECONTAMINATION SYSTEM

TECHNICAL FIELD

The present invention relates to a process and apparatus for moving corrosive contaminants from fuels.

BACKGROUND OF THE INVENTION

The presence of sodium, sulfur, and other corrosive contaminants in fuels burned in turbine, as well as reciprocating engines, causes expensive maintenance problems and shortens engine life. Turbine engine fuel contamination problems are found in land and marine equipment, especially in middle east installations. Significant problems from contaminated fuel are also seen with turbine engines used for propulsion of ships. Fuel contamination results in corrosion of turbine engine parts, especially at high operating temperatures. High temperature corrosion results from the presence of vanadium, sodium and potassium. These elements form compounds during engine operation which form deposits on components, dissolve coatings, and leave parts open to sulfidation attack.

Generally, refiners of hydrocarbon fuels employ processes to remove sulfur and metal ion contamination from middle distillate hydrocarbons which are essentially procedures where the hydrocarbon is first treated with water (steam). Water is employed to extract water soluable contaminants from the hydrocarbons. Water, along with contaminants, is then removed by using centrifugal methods, water coalescing techniques, passive gravity (settling) methods, and filtration. There are inherent inefficiencies in these multiple steps and reduction of water, sulfur and metallic contamination to levels that meet standards and specifications of fuel users is often difficult and expensive.

Once purified at the refinery, middle distillate hydrocarbons often become recontaminated enroute to the point of use. Salty or contaminated water is often co-mingled with middle distillate fuels during transportation and storage. Users of middle distillate fuels, such as those operating turbine engines, must maintain special fuel treatment and purification equipment to protect their engines from damage. Most turbine engine manufacturers specify liquid fuel purity requirements. Turbine engine fuels such as liquid petroleum gas, light virgin naptha, heavy virgin naptha, kerosenes, diesel fuels and gas oils are required to contain less than 1% by weight free water and less than 0.1 parts/million of vanadium, sodium, potassium, calcium and lead. Copper must be below 0.02 parts/million. Consequently, these engine fuels must undergo purification processes that assure users that damage to internal critical engine parts is minimized.

Prior art decontamination techniques often include multiple steps for the purification of middle distillate fuels both at the refining stage and at point of use. These prior art techniques such as centrifugal methods, coalescing processes, passive gravity settling and filtration do not always efficiently separate water and contamination from the hydrocarbon. A particularly difficult separation problem results from the oil/water interface between the water hydrocarbon phases. Centrifugal and passive gravity settling techniques cannot efficiently deal with this interface and some cross-contamination frequently occurs between the water and oil phases. Coalescers can handle only certain maximum water volumes in petroleum hydrocarbons before they become overpowered by entrained water and fail. Conventional filtration, of course, is not capable of separation of water from hydrocarbons at all.

The present invention provides a simple, efficient technique wherein water from any source is co-mingled with hydrocarbons, either intentionally or inadvertently and can be removed from the hydrocarbons with a hollow fiber cross flow membrane system.

The former cross flow systems using hollow fiber membranes required a pump which acted against fluid resistances generated by the piping between the pump outlet and the entry to the separation module including the hollow fiber membrane. Loss of fluid from inside to outside of the hollow fibers, such as by permeation, causes a reduction in volume and resistance that is counter balanced by the resistance subsequently generated by the hollow fibers themselves and by the piping during the return of the retentate fluid back to the reservoir of the system.

Contaminated fluid would be fed by a pump to a membrane cross separation model. Permeate would be conducted to an engine or a reservoir and retentate would be recycled back to a open reservoir. The reservoir would be drained of settled contaminants. The reservoir would feed into the contaminated fluid line being pumped directly to the membrane cross separation module for recycling and further decontamination.

A further disadvantage of this system is the use of the reservoir. A detection system must be employed with a reservoir in a cross flow system, such as float valves, for monitoring high and low fluid levels. This is required so that small changes in flow either to the system or out of the system do not cause the reservoir to either over flow or cause the pump to run dry. This necessary feature adds to the cost and reduces the reliability of the overall system. Further, as water builds in the reservoir, a proportionate reduction in permeate flow rate occurs unless this water is removed from the system. In many cases, the volume of water is not large enough per unit volume of fluid being decontaminated, but there are occasions when the large water volume can enter the system and cause a significant permeate flow rate reduction. This represents a problem if the system is hooked directly to a jet engine fuel supply.

Another disadvantage of the use of reservoir in cross flow separation systems is the inconvenience of removal of water and particulate contamination in a continuous manner as it builds up in the retentate fluid during operation.

The present invention provides a decontamination system which further eliminates the reservoir entirely and incorporates significant improvements in system efficiency.

Inherent in the reservoir type systems is an inefficient use of the entire length of the hollow fiber membranes. Applicant has found that the portion of the hollow fibers proximate to the separation module inlet of the system meet a higher pressure head then those portions at the distall end of the housing fibers proximate to the separation module output. The present invention further provides means for increasing the efficiency of the entire length of the hollow fiber membrane thereby increasing the permeate output of a separation module unit.

SUMMARY OF THE INVENTION AND ADVANTAGES

In accordance with the subject invention there is provided a process for moving corrosive contaminants from fuels, the process including the steps of mixing water with a hydrocarbon contaminated with corrosive ions into a mixture and conducting a flow of the mixture tangentially relative to a surface of a plurality of microporous hydrophobic hollow fiber membranes and separating a permeate flow of decontaminated hydrocarbon from the retentate mixture.

The present invention further provides a fluid separation apparatus including pumping means for pumping mixture from a source to a separator means and tangential flow separator means in fluid communication of the pumping means for separating by cross flow separation a fluid permeate from a fluid mixture retentate. The separator means includes an inherent resistance to uniform tangential flow. The apparatus includes resistance removing means for moving the resistance to flow through the separator means aiding in increased uniform tangential flow through the separator means.

DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
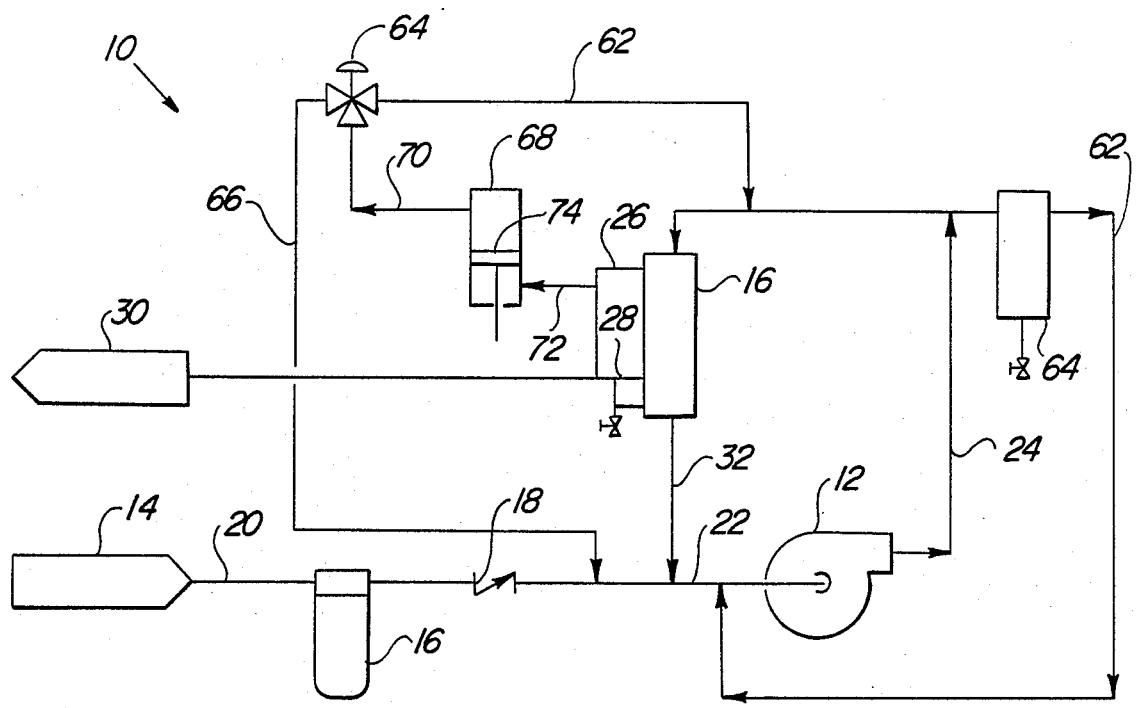
FIG. 1 is a schematic diagram of a fuel decontamination system constructed in accordance with the present invention.

A schematic representation of fluid decontamination apparatus is generally shown at 10 in FIG. 1.

Generally, the apparatus 10 includes a pump 12 for pumping a fluid mixture from a source 14 to a separator module 16. The separator module 16 provides tangential flow separator means in fluid communication with the pump 12 for separating by cross flow separation a flow of decontaminated hydrocarbon from the permeate retentate mixture, the separator means 16 including an inherent resistance to uniform tangential flow. The apparatus includes resistance removing means for removing the resistance to flow through the separator means 16 aiding in increased uniform tangential flow through the separator means 16.

More specifically, the apparatus schematically shown in FIG. 1 at 10 includes a source for contaminated fluid in fluid communication through a strainer 16 to a check valve 18 by means of conduit 20. The check valve 18 is in fluid communication to the pump through inlet conduit 22. Outlet conduit 24 is in fluid communication between the pump 12 and separation module 16. Outlet conduits 26 and 28 carry a fluid permeate separated from the contaminated fluid to a permeate destination 30, such as a storage tank or directly to an engine for use. Outlet conduit 32 carries fluid retentate from the separation module to be recirculated in inlet line 22.

Figure 3:
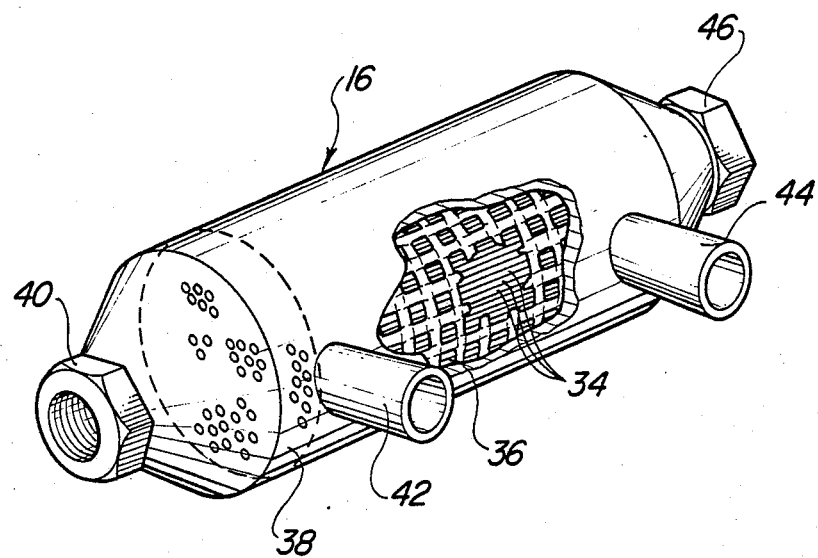
FIG. 3 is a perspective view partially broken away of a filter assembly constructed in accordance with the present invention.
Figure 4:
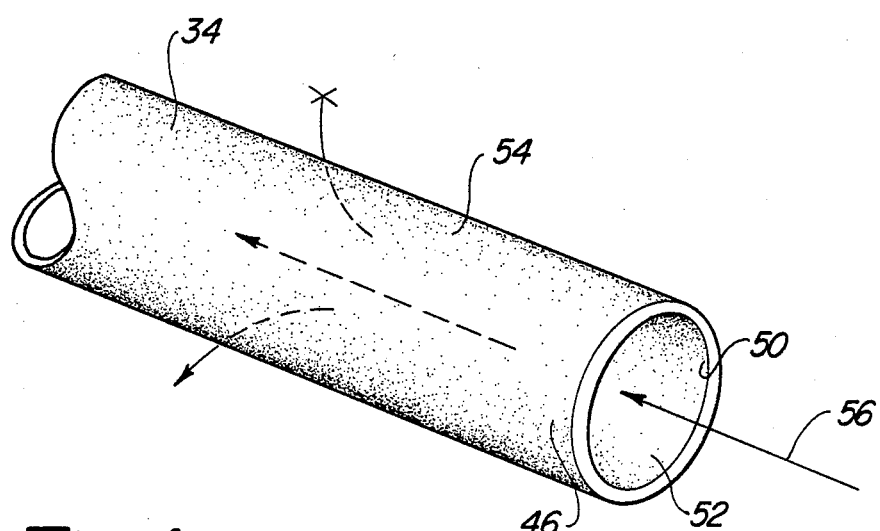
FIG. 4 is a fragmentary cross sectional view of a hollow fiber membrane illustrating tangential flow separation.

The separator module 16 comprises a plurality of hollow fiber membranes 34, shown in FIGS. 3 and 4. The membranes 34 are contained within a plastic web 36, the web being contained within a separator module 38. The separator module 38 includes an inlet 40 and a first pair of outlets 42, 44 which are in fluid communication with conduits 26, 28 respectively and a retentate fluid outlet 46 in fluid communication with outlet conduit 32. The separator module 38 contains a plurality of hollow hydrophobic microporous membrane fibers 40 contained as a bundle within the web 36. The fibers 34 are embedded in a potting material 48 adjacent the inlet 40. Each fiber 34 includes a hollow core 50, the fiber 34 having an inner surface 52 extending about the hollow core 50. Each fiber 34 also includes an outer surface 54. The hollow cores 50 of the fibers 34 define a plurality of bores in fluid communication between the inlet 40 and the outlet 46. The outer surfaces 54 of the fibers 34 in combination with the inner wall of the module housing 38 define an outer chamber in fluid communication with the outlets 42, 44.

The membrane fibers 34 are microporous membranes separating the inner bores 52 from the outer chamber. The membrane fibers 34 extend parallel to the first flow path 56 and tangentially contact the length of the flow path 56.

The fiber 34 can comprise a homogenous layer of microporous material made from hydrophobic materials such as polypropylene and tetrafluororethylene fluorocarbon resins. The resins included in this group must be extremely resistant to degradation in the presented environment of hydrophilic elements such as water and dissolved water soluble components, as well as in the hydrocarbon environmental of the fluids.

For example, a ten inch module can contain 197 hollow fibers having a inner diameter of 0.6 mm and an average bore size of 0.20 microns. A 20 inch module can contain 440 hollow fibers having an inner diameter of 0.6 mm and an average bore size 0.20 microns. All values are plus minus 10%.

As discussed in detail in the prior art section, prior art systems including modules such as the module 16 of the present invention include inherent inefficiencies in the separation process. The present invention includes resistance removing means for removing the resistance to fluid through the separator means 16 aiding in the increased uniform tangential flow through the separator means 16 and specifically through the fibers 34 thereby overcoming the inherent problems of prior art systems.

The resistance removing means includes means for actively drawing retentate from the retentate outlet 46. By actively drawing the retentate from outlet 46, a positive decrease of the resistance normally applied by the inner surfaces 50 of the fibers 34 is effected. Accordingly, increased separation efficiency is obtained along the length of the fibers 34 thereby increasing the efficiency of the separation. In accordance with the subject invention, each fiber will separate an increased amount of permeate from a unit volume of flow into the separation modules over a given unit of time.

As shown in FIG. 1, the drawing means include the first conduit 20 in fluid communication between the contaminated fluid source 14 and the pump 12 and the second conduit 32 in fluid communication between the separator module outlet 46 and the first conduit 20 whereby the pump 12 simultaneously draws fluid mixture from the source 14 and retentate from the separator module 16, both fluids being mixed in the conduit 22 and delivered through conduit 24 to the inlet 40 of the separation module 16. The pump 12 actively draws contaminated fluid from the source 14 while simultaneously the pump 12 draws retentate from the retentate outlet 46 thereby counteracting against the resistance to flow through the separator means 16 and specifically through the bores 50 of the fibers 34 aiding in increased tangential flow through the length of the fibers 34.

Figure 2:
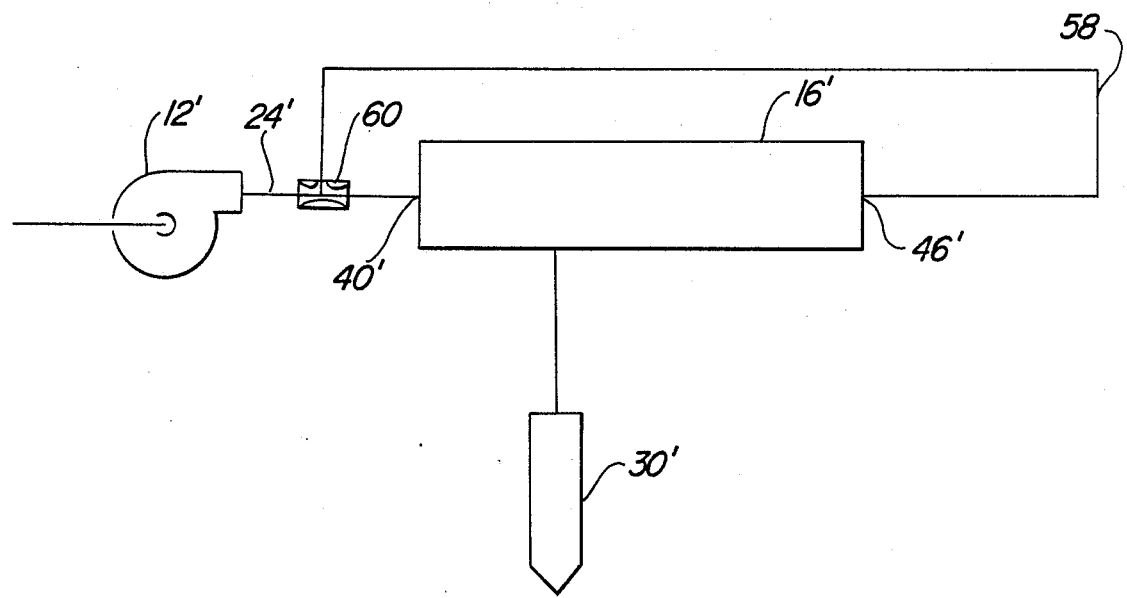
FIG. 2 is a second embodiment of the fuel decontamination system.

A second embodiment of the inventive resistance removing means in shown in FIG. 2. Like primed numbers are used to designate similar features of the two embodiments.

The drawing means includes the first conduit 24' in fluid communication between the pump 12' and the inlet 40' of the separation module 16'. A second conduit 58 is in direct communication between the retentate outlet 46' of the separation module 16' and first conduit 24' at an arm of a venturi inlet, schematically shown at 60, thereby creating a venturi effect at the point of communication between the first and second conduits 24', 58 actively drawing retentate flow from the retentate outlet 46'.

This embodiment is particularly useful environments wherein an add-on pump to a system is not available. This system can be utilized on devices such as gas pumps utilizing the pump already contained within the gas pump, the venturi effect acting as the drawing means. The invention would be useful at gas stations, airports, or boat docks, wherein the embodiment as shown in FIG. 2 could be added onto or spliced into existing fuel delivery lines.

Referring to FIG. 1, the apparatus includes a third conduit 62 in fluid communication between the conduit 24 and the conduit 22 between the point of communication with the conduit 20 and the pump 12. A means for dehydrating fluid within the conduit 62 dehydrates the fluid mixture flow passing therethrough. The dehydrating means can include a coalescer 64 on-line with the conduit 62 for removing water from the retentate flow. The coalesser is an off line from the conduits delivering contaminated fluid from the source 14 through the pump 12 and to the separation module 16 thereby not contributing to the fluid dynamics of the main line path of fluid flow through the system. However, the coalescer 64 is capable through the alternate flow-through conduit 62 to efficiently remove water from the retentate flow at a rate independent of the fluid flow rate through the separation module 16.

The present invention further provides a process for removing corrosive contaminants from fuels. The process includes the steps of mixing water with a hydrocarbon contaminated with corrosive ions into a mixture and conducting a fluid of the mixture tangentially relative to the surface of a plurality of microporous hydrophobic hollow fiber membranes and separating a permeate flow of decontaminated hydrocarbon from the retentate mixture. The process is capable of separating contaminates from the group including sodium, sulfur, potassium, calcium, lead and copper from the hydrocarbon as the hydrocarbon tangentially flows through the membranes.

More specifically, the inventive process utilizes the apparatus discussed above for recirculating the retentate through the membrane fibers 34 to further remove decontaminated hydrocarbon permeate therefrom. The hydrocarbon-water mixture is first made, intentionally or inadvertently, and the mixture is pumped from the source 14 to the inlet 40 of the separation module 16 containing the microporous membrane fibers 34 and through the bores 50 of the membrane fibers 34. The pump 12 or venturi effect at 60 removes resistance of flow through the bores 50 of the membrane fibers 16 aiding in increasing the uniform flow throughout the length of the bores 50 of the membrane fibers 34. The process thereby includes the step of removing resistance by activity drawing retentate from the module outlet 46. Thusly, the resistance is removed by mixing the retentate with the mixture from the source 14 and pumping the retentate and mixture from the source 14 to the inlet 40 of the module 16 and pumping the retentate from the module outlet 46 and recirculating the retentate mixture back to the module inlet 40. Alternatively, the pump 12 is operatively connected to the module as shown in FIG. 2 and the retentate is conducted to the conduit 22' upstream of the pump 12' and the retentate is drawn into the conduit 22' by a venturi effect.

The process further includes steps of dividing a portion of the flow of the mixture from the pump 12 and dehydrating the divided portion of the flow and returning the dehydrated portion to the flow of mixture flowing to the inlet 40 of the module 16, as by use of coalesser 64.

The present invention is a simpler, more efficient technique than prior art methods of centrifugally removing contaminants from hydrocarbons. The present invention rapidly removes the contamination of hydrocarbons utilizing hollow fiber cross flow membrane techniques. Further, corrosive contaminants are removed along with the water from the hydrocarbon. The hollow fiber member system is capable of removing substantially all of the free water (entrained water) from the hydrocarbons and it is also capable of removing dissolved (equilibrium vs. temperature dependent) water from the same hydrocarbons.

The present invention eliminates the necessity of the reservoir of prior art assemblies entirely and incorporates the recirculating system and check valve 18 of the present invention. The arrangement removes the resistance that formerly resulted from the pressure generated by the return line to the reservoir in the old systems.

This invention has been characterized as a push pull arrangement where fluid is pumped into the separation module 16, and then pulled out and away from the module 16 by having the retentate return flow directly back to the suction side of the pump 12 or to the venturi as shown in FIG. 2. This arrangement has been discovered to be of particular importance for the achievement of maximum fluid mechanical advantage of any cross flow separation system.

The check valve 18 is important to the system as it regulates flow in the retentate recirculation loop with flow coming from the incoming primary contaminated fluid source 14. Check valve 18 also prevents flow of retentate backwards through the primary contaminated fluid feed line 20. The retentate recirculation volume is therefore held to a minimum not requiring a reservoir.

The strainer 16 removes particulate contaminants possibly contained within the original source 14 of fluid.

The present invention provides for efficient and continuous removal from the retentate main fluid volume without loss permeate flow rate. This effect is seen even when 50% or more water is allowed to enter the primary contaminated fluid feed stream. Water is quickly isolated by the side stream through conduit 62 and does not remain in the module circulation. Water particulate matter are thus trapped by the filter separator for convenient disposal.

A further discovery utilizing the present invention is that the pressure exerted by the pump 12 upon the fluid passing through the inside of the hollow fibers 34 can be balanced with the permeate fluid pressure to achieve optimum permeate flow rate as well as optimum separation efficiency. Depending upon the viscosity of the fluid being decontaminated, temperature, and the diameter of the hollow fibers in the separation module, the pump can be adjusted so as to achieve optimum retentate fluid flow velocity and pressure. The pump 12 not only pushes fluid to the module 16 but also serves to remove resistance to flow utilizing the push pull effect through the bores 50 of the fibers 34 which significantly aids in maintaining truly tangential fluid flow. This effect dramatically improves the working surface area of the hollow fibers 34 within the separation module 16.

For example, in prior art systems, permeation begins to occur immediately within the upper region of the separation module and falls off to nil to the extreme of the lower end of the module when the module is viewed in a vertical position. The same effect occurs when the module is in a horizontal position. This permeate flow reduction effect is more pronounced with high viscosity fluids but is also readily observable with low viscosity fluids, such as kerosene. The reason for this effect is that fluid resistance builds as the fluid from the retentate side flows through the bores of the membranes. At the same time, fluid loss occurs by permeation of fluid through the pores of the membrane 34. The fluid loss is replaced by the fluid volume supplied by the pump and a balance is struck between contaminated fluid entering the system and pure permeate leaving the system. With prior art systems, the major volume of permeate is observed to occur only in the first half of the module because the region near the outlet of the module exerts a high enough resistance to retard flow. This so called back pressure causes partial loss of tangential flow on the retentate side and causes the fluid to be forced to the pores of the membrane along with water and particulate matter.

The present invention removes this resistance by directing the retentate flow on the module directly back to the pump suction inlet. In this manner, build up of back pressure is eliminated in the module retentate side and true tangential flow is maintained regardless of the fluid viscosity. Optimum cross flow separation efficiency versus permeate flow rate are therefore achieved.

Referring to FIG. 1, the apparatus includes conduit 62 in fluid communication between conduit 24 and a three way valve 64. The three way valve 64 is in fluid communication with conduit 22 through conduit 66. The three way valve is in fluid communication with one side of a piston cylinder assembly 68 through conduit 70. The functionally opposite side of the piston cylinder assembly 68 is in fluid communication with conduit 26 through conduit 72. The combination of the three way valve 64, cylinder assembly 68 and conduits 62, 66, 70 and 72 provide a back pulse membrane cleaning mechanism for the separation module. The system effectively removes debris from the fiber inner surfaces 52 of the hollow fibers 34 by creating a back pulse of fluid flow as retentate flow is maintained through the bores 50 of the fiber.

During start up or shut down, the three way valve 64 is adjusted to allow flow from conduit 62 through conduit 70 to force a piston 74 within the cylinder 68 to move fluid in conduit 72 through conduits 26 and 28 to create a back pressure from the outer surfaces 54 of the hollow fibers 34 through the inner surfaces 52 as a retentate flow is passed through the bores 50 or the fibers 34. This pulse releases any particulate contamination of the inner surface 52 of the fibers 34. All that is necessary is a momentary back pulse to drive a volume of fluid backward through the pores of the fibers 34 to release the particulate matter from the inner surfaces 52 as the retentate flow 56 sweeps the particulate matter from the bores 50.

EXAMPLES

A contaminated fluid source of a unit constructed in accordance with the present invention was filled with three gallons of clear diesel fuel and circulated through the system. Samples were taken from the reservoir and from the permeate outlet following this recirculation. These samples were marked "undoped fuel from tank or outlet". This system was then doped with 500 ml of synthetic sea water, the fuel recirculated for five minutes and samples taken again from the reservoir tank and from the permeate outlet. The results were as follows:

|  | SODIUM vppm |
|---|---|
| Undoped Fuel from Tank | 1.0 |
| Undoped Fuel from Permeate Outlet | 0.1 |
| Doped Fuel from Tank | 10 |
| Doped Fuel from Permeate Outlet | 0.1 |

It can be seen from the data obtained that the unit has a very high efficiency for water and sodium removal. This ability would be extremely useful in areas such as the Middle East where fuel supplies are very variable and also in marine and off shore uses where contact arises between fuel and sea water.

The values obtained in the experiment are well within the guidelines set forth for industrial requirements of sodium and water removal from fuel. Unlike prior art units which would require centritugation or a settling step, the present invention provides for immediate separation immediately after the mixing of water and fuel. Hence, the present invention provides an extremely effective means for removing corrosive contaminants from hydrocarbons, providing a time efficient means for obtaining these results.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. Process comprising removing corrosive contaminants from a hydrocarbon fuel by;

mixing water with a hydrocarbon fuel contaminated with corrosive ions into a mixture;

conducting a flow of the mixture tangentially relative to a surface of a plurality of microporous hydrophobic hollow fiber membranes (34) and separating a permeate flow of decontaminated hydrocarbon from the retentate mixture.

2. A process as set forth in claim 1 wherein said separating step in further defined as separating contaminants from the group including sodium, sulfur, potassium, calcium, lead and copper from the hydrocarbon as the hydrocarbon tangentially flows through the membranes (34).

3. A process as set forth in claim 2 further including the step of recirculating the retentate through the membranes (34) to further remove decontaminated hydrocarbon permeate therefrom.

4. A process as set forth in claim 3 wherein the membranes (34) have internal bores (50), said conducting step being further defined as pumping the mixture from a source (14) to an inlet (40) of a separation module (16) containing the microporous membranes (34) and through the bores (50) of the membranes (34) and removing resistance of flow through the bores (50) of the membranes (34) aiding in increasing uniform flow through the length of the bores (50) of the membranes (34).

5. A process as set forth in claim 4 wherein the module (16) includes an outlet (46), said step of removing resistance being further defined as actively drawing retentate from the module outlet (46).

6. A process as set forth in claim 5 wherein the step of removing resistance is further defined as mixing the retentate with the mixture from the source (14) and pumping the retentate and mixture from the source (14) to the inlet (40) of the module (16).

7. A process as set forth in claim 6 wherein said step of pumping the mixture and retentate is further defined as pumping the retentate directly from the module outlet (46) and the drawing retentate and mixture back to the module inlet (40).

8. A process as set forth in claim 7 further including the step of dividing a portion of the flow of the mixture from the pump (12) and dehydrating the divided portion of the flow and returning the dehydrated portion to the flow of mixture flowing to the inlet (40) of the module (16).

9. A process as set forth in claim 6 wherein a pump (16') is operative connected to the module (16') for fluid communication by a conduit (24'), said pumping step further defined as conducting the retentate to the conduit (22') upstream of the pump (12') and drawing the retentate into the conduit (22') by venturi effect.

10. A fluid separation process comprising the steps of:
removing corrosive contaminants from a hydrocarbon fuel, by;

conducting a flow of a fluid mixture to an inner surface (52) of a bore (50) of a plurality of hollow fiber membranes (34) to separate a permeate flowing tangentially through the membranes (34) from a retentate flowing through the bores (50) and removing resistance of the flow through the bores (50) of the membranes (34) aiding in increasing uniform flow through the length of the bores (50) of the membranes (36).

11. A process as set forth in claim 10 wherein said removing step is further defined as actively drawing retentate from the bores (50).

12. A process as set forth in claim 11 wherein the step of removing resistance is further defined as mixing the retentate with the mixture from a source (14) and pumping the retentate and mixture from a source (14) to the inlet (40) of the module (16).

13. A process as set forth in claim 12 wherein the membranes (34) are contained in at least one module (38) including an inlet (40) and a retentate outlet (46), said step of pumping the mixture and retentate is further defined as pumping the retentate directly from the module outlet (46) and the drawing retentate and mixture back to the module inlet (40).

14. A process as set forth in claim 12 wherein the membranes (34) are contained in a module (38) including an inlet (40) and an outlet (46), a pump (12'), said pumping step further defined as conducting the retentate to the conduit (22') upstream of the pump (12') and drawing the retentate into the conduit (22') by venturi effect.

15. A process as set forth in claims 13 or 14 further including the step of dividing a portion of the flow of the mixture from the pump (12) and dehydrating the divided portion of the flow and returning the dehydrated portion to the flow of mixture flowing to the inlet of the module (16).

* * * * *